United States Patent
Yamane et al.

(10) Patent No.: US 11,905,368 B2
(45) Date of Patent: Feb. 20, 2024

(54) WATER-REPELLENT MEMBER AND METHOD FOR MANUFACTURING WATER-REPELLENT MEMBER

(71) Applicant: SHIN-ETSU CHEMICAL CO., LTD., Tokyo (JP)

(72) Inventors: Yuji Yamane, Annaka (JP); Lisa Katayama, Annaka (JP); Ryusuke Sakoh, Annaka (JP); Takashi Matsuda, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 432 days.

(21) Appl. No.: 16/633,495

(22) PCT Filed: Jun. 12, 2018

(86) PCT No.: PCT/JP2018/022414
§ 371 (c)(1),
(2) Date: Jan. 23, 2020

(87) PCT Pub. No.: WO2019/035271
PCT Pub. Date: Feb. 21, 2019

(65) Prior Publication Data
US 2021/0130545 A1    May 6, 2021

(30) Foreign Application Priority Data
Aug. 17, 2017    (JP) ................ 2017-157533

(51) Int. Cl.
*C09D 5/16* (2006.01)
*C08G 65/336* (2006.01)
*C09D 1/00* (2006.01)
*C09D 5/00* (2006.01)
*C09D 171/00* (2006.01)

(52) U.S. Cl.
CPC ............ *C08G 65/336* (2013.01); *C09D 1/00* (2013.01); *C09D 5/002* (2013.01); *C09D 5/1662* (2013.01); *C09D 5/1675* (2013.01); *C09D 5/1693* (2013.01); *C09D 171/00* (2013.01); *C01P 2004/64* (2013.01)

(58) Field of Classification Search
CPC ...... C08G 77/24; C08G 77/458; C08G 77/46; C08G 65/007; C08G 65/283; C08G 65/336; C08G 2650/48; B32B 27/283; B32B 27/285; C09D 171/00; C09D 171/02; C09D 183/00; C09D 183/04–08; C09D 5/1662; C09D 5/1675; C09D 5/1693
See application file for complete search history.

(56) References Cited

U.S. PATENT DOCUMENTS

| | | |
|---|---|---|
| 2007/0141114 A1 | 6/2007 | Muisener et al. |
| 2007/0149746 A1 | 6/2007 | Yamane et al. |
| 2007/0197758 A1 | 8/2007 | Yamane et al. |
| 2007/0231527 A1 | 10/2007 | Tamaki et al. |
| 2008/0071042 A1 | 3/2008 | Yamane et al. |
| 2008/0114120 A1 | 5/2008 | Koike et al. |
| 2010/0029889 A1 | 2/2010 | Yamane et al. |
| 2010/0076211 A1 | 3/2010 | Yamane et al. |
| 2011/0058142 A1* | 3/2011 | Berit-Debat ......... B05D 3/0254 427/164 |
| 2011/0098402 A1 | 4/2011 | Yamane et al. |
| 2012/0107558 A1* | 5/2012 | Koval ................. C03C 17/3429 977/773 |
| 2013/0216820 A1* | 8/2013 | Riddle .................. C09D 5/002 427/407.1 |
| 2014/0113145 A1 | 4/2014 | Yamane et al. |
| 2014/0120340 A1* | 5/2014 | Riddle ..................... C09D 5/00 428/312.6 |
| 2014/0125945 A1* | 5/2014 | West ....................... G02B 1/18 351/159.57 |
| 2014/0147680 A1 | 5/2014 | Yamane et al. |
| 2014/0302332 A1 | 10/2014 | Murotani et al. |
| 2015/0307719 A1 | 10/2015 | Mitsuhashi et al. |
| 2015/0315443 A1* | 11/2015 | Takeda ................. C09D 183/08 428/448 |

(Continued)

FOREIGN PATENT DOCUMENTS

| | | |
|---|---|---|
| JP | 2007-197425 A | 8/2007 |
| JP | 2007-297543 A | 11/2007 |

(Continued)

OTHER PUBLICATIONS

Lin et al, "Robust superhydrophobic transparent coatings fabricated by a low-temperature sol-gel process", Applied Surface Science, vol. 305, 2014, 702-709. (Year: 2014).*

(Continued)

*Primary Examiner* — Z. Jim Yang
(74) *Attorney, Agent, or Firm* — Birch, Stewart, Kolasch & Birch, LLP

(57) ABSTRACT

Provided is a water-repellent member in which a silica layer having a specific thickness and mainly composed of silica nanoparticles is provided on the outer surfaces of various substrates, and then a water- and oil-repellent layer having a specific thickness and containing a cured product of a fluorine-containing organosilicon compound as a main component is provided on the outer surface of the silica layer. The water-repellent member is obtained by a method comprising: a step for wet coating a dispersion containing silica nanoparticles and a solvent onto the outer surface of a substrate; a step for drying and removing the solvent from the dispersion; a step for wet coating a solution containing a fluorine-containing organosilicon compound and a solvent onto the outer surface of a silica layer formed by drying and removing the solvent; and a step for drying and removing the solvent from the solution to cure the fluorine-containing organosilicon compound. According to the water-repellent member, a water- and oil-repellent coating having excellent abrasion resistance can be reliably and easily applied to various substrates.

5 Claims, No Drawings

(56) References Cited

U.S. PATENT DOCUMENTS

| | | | |
|---|---|---|---|
| 2015/0337430 A1 | 11/2015 | Yoshida et al. | |
| 2015/0375475 A1* | 12/2015 | Cook | C03C 3/11 |
| | | | 65/60.5 |
| 2016/0376450 A1 | 12/2016 | Jung et al. | |
| 2017/0183255 A1* | 6/2017 | Walther | C03C 3/091 |
| 2017/0252761 A1* | 9/2017 | Meuler | C09D 127/18 |
| 2017/0283316 A1* | 10/2017 | Meuler | B05D 5/08 |
| 2018/0304287 A1* | 10/2018 | Meuler | B05B 7/2408 |
| 2019/0136073 A1* | 5/2019 | Bake | B05D 1/36 |
| 2019/0169460 A1* | 6/2019 | Loth | B05D 7/56 |
| 2019/0177574 A1* | 6/2019 | Takeda | C08G 77/54 |
| 2020/0317564 A1* | 10/2020 | Bao | C08K 3/22 |

FOREIGN PATENT DOCUMENTS

| | | |
|---|---|---|
| JP | 2007-297589 A | 11/2007 |
| JP | 2008-88412 A | 4/2008 |
| JP | 2008-144144 A | 6/2008 |
| JP | 2009-519149 A | 5/2009 |
| JP | 2010-31184 A | 2/2010 |
| JP | 2010-47516 A | 3/2010 |
| JP | 2011-116947 A | 6/2011 |
| JP | 2011-178835 A | 9/2011 |
| JP | 2013-189007 A | 9/2013 |
| JP | 2013-253228 A | 12/2013 |
| JP | 2014-503380 A | 2/2014 |
| JP | 2014-84405 A | 5/2014 |
| JP | 2014-105235 A | 6/2014 |
| JP | 2014-218639 A | 11/2014 |
| JP | 2015-24637 A | 2/2015 |
| JP | 2015-222364 A | 12/2015 |
| JP | 2017-515649 A | 6/2017 |
| WO | WO 2006/051828 A1 | 5/2006 |
| WO | WO 2010/038648 A1 | 4/2010 |
| WO | WO 2013/121984 A1 | 8/2013 |
| WO | WO 2014/097388 A1 | 6/2014 |
| WO | WO-2018034138 A1 * | 2/2018 ............ C03C 17/30 |

OTHER PUBLICATIONS

International Search Report (PCT/ISA/210) issued in PCT/JP2018/022414, dated Sep. 4, 2018.

Written Opinion of the International Searching Authority (PCT/ISA/237) issued in PCT/JP2018/022414, dated Sep. 4, 2018.

* cited by examiner

WATER-REPELLENT MEMBER AND METHOD FOR MANUFACTURING WATER-REPELLENT MEMBER

TECHNICAL FIELD

This invention relates to a water repellent member and a method for preparing the same. More particularly, it relates to a water repellent member having a silica layer composed mainly of silica nanoparticles between a substrate and a water/oil repellent layer, and a method for preparing the same.

BACKGROUND ART

For the purpose of improving aesthetic appearance or visibility, the demand for the technology of rendering articles unsusceptible to staining or the technology of cleaning off stains is increasing every year. In particular, since eyeglass lenses, smartphones, wearable terminals, car navigation panels, electronic instrument housings, kitchen cabinets, and transportation vehicle bodies are susceptible to deposition of sebum and oil stains on their surface, it is desired to provide their surface with a water/oil repellent layer. However, fluorinated compounds used as the water/oil repellent agent are non-adhesive or non-bondable to various substrates because of very low surface free energy. It is thus difficult to attach the water/oil repellent agent directly to substrates.

To address the problem, as a treating agent capable of water/oil repellent treatment on surfaces of glass and other substrates, for example, Patent Document 1 (JP-A 2011-116947) discloses a fluorooxyalkylene group-containing polymer composition having the following average compositional formula:

$$A\text{-}Rf^1\text{-}B \quad \text{[Chem. 1]}$$

wherein $Rf^1$ is a divalent linear fluorooxyalkylene group containing 5 to 100 repeating units: $-C_dF_{2d}O-$ wherein d is an integer of 1 to 6 and may be different among repeating units, A and B are each independently a group selected from $Rf^2$ and the following formula:

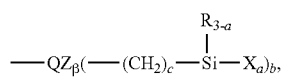

[Chem. 2]

$Rf^2$ is F, H, or a monovalent fluorinated group terminated with $-CF_3$ or $-CF_2H$ group, Q is a divalent organic group, Z is a di- to heptavalent organopolysiloxane residue having a siloxane bond, R is $C_{1-4}$ alkyl or phenyl, X is a hydrolyzable group, a is 2 or 3, b is an integer of 1 to 6, c is an integer of 1 to 5, and β is an integer of 0 or 1.

Although the treating agent of Patent Document 1 exhibits relatively good durability on surfaces of substrates typically of glass where a number of silanol groups (i.e., silicon-bonded hydroxyl groups) are present, it is difficult to provide good adhesion of the agent to surfaces of metals, metal oxides and resins.

As the means for improving adhesion, Patent Document 2 (WO 2014/097388) discloses a method of depositing a $SiO_2$ layer as a primer layer by a dry process like evaporation or sputtering. It is described that a water/oil repellent layer having good durability is formed by this method. However, the range of application of this method is limited from the standpoints of productivity and production cost because treatment must be conducted in vacuum and a massive unit is necessary for coating large-size substrates.

On the other hand, Patent Document 3 (WO 2010/038648) discloses a polysilazane solution from which a primer layer is deposited by a wet process. After the polysilazane solution is coated on a substrate surface, the polysilazane solution is converted to silica glass through reaction with moisture. Although this method is superior to the dry method in that the vacuum process is not used, there are left problems of productivity and cost because high-temperature heating or humidifying over a long term is necessary to stabilize the adhesion of a water/oil repellent layer. Another problem is that the substrates to which the method is applicable are limited. As the prior art technology relating to the present invention, the following documents are cited as well as the above-cited documents.

PRIOR ART DOCUMENTS

Patent Documents

Patent Document 1: JP-A 2011-116947
Patent Document 2: WO 2014/097388
Patent Document 3: WO 2010/038648
Patent Document 4: JP-A 2007-197425
Patent Document 5: JP-A 2007-297589
Patent Document 6: JP-A 2007-297543
Patent Document 7: JP-A 2008-088412
Patent Document 8: JP-A 2008-144144
Patent Document 9: JP-A 2010-031184
Patent Document 10: JP-A 2010-047516
Patent Document 11: JP-A 2011-178835
Patent Document 12: JP-A 2014-084405
Patent Document 13: JP-A 2014-105235
Patent Document 14: JP-A 2013-253228
Patent Document 15: JP-A 2014-218639
Patent Document 16: WO 2013/121984

SUMMARY OF INVENTION

Technical Problem

An object of the invention, which has been made under the above-mentioned circumstances, is to provide a water repellent member having improved abrasion resistance, and a method for preparing a water repellent member by depositing a water/oil repellent layer having improved abrasion resistance on an outer surface of any one of various substrates by the wet technique.

Solution To Problem

Making extensive investigations to attain the above object, the inventors have found that a water repellent member in which a silica layer composed mainly of silica nanoparticles and having a specific thickness is deposited on the outer surface of any one of various substrates, and a water/oil repellent layer composed mainly of a cured product of a fluorinated organosilicon compound and having a specific thickness is then deposited on the outer surface of the silica layer is obtained by a method comprising the steps of wet coating a dispersion of silica nanoparticles in a solvent onto the outer surface of a substrate, drying the dispersion to remove the solvent and to form a silica layer, wet coating a solution of a fluorinated organosilicon compound in a solvent onto an outer surface of the silica layer, and drying the solution to remove the solvent and to cure the fluorinated organosilicon compound, and that the water repellent member can endow various substrates with a water/oil repellent film having improved abrasion resistance in a consistent simple manner. The invention is predicated on this finding.

Accordingly, the invention provides a water repellent member and a method for preparing the same, as defined below.

[1]
A water repellent member comprising a substrate having an outer surface, a silica layer disposed on the substrate outer surface, containing at least 50% by weight of silica nanoparticles, and having a thickness of 1 nm to 5 µm, and a water/oil repellent layer disposed on an outer surface of the silica layer, composed mainly of a cured product of a fluorinated organosilicon compound, and having a thickness of 0.5 to 30 nm.

[2]
The water repellent member of [1] wherein the fluorinated organosilicon compound is a fluorooxyalkylene group-containing organosilicon compound having at least one hydrolyzable group.

[3]
The water repellent member of [1] or [2] wherein the fluorinated organosilicon compound is at least one compound selected from hydrolyzable fluorinated organosilicon compounds having the general formulae (1), (2), (3), (4), and (5):

$$(A\text{-Rf})_\alpha\text{---}ZW_\beta \quad (1)$$

$$\text{Rf---}(ZW_\beta)_2 \quad (2)$$

$$Z'\text{---}(\text{Rf---}ZW_\beta)_\gamma \quad (3)$$

wherein Rf is $-(CF_2)_d-O-(CF_2O)_p(CF_2CF_2O)_q(CF_2CF_2CF_2O)_r(CF_2CF_2CF_2CF_2O)_s(CF(CF_3)CF_2O)_t-(CF_2)_d-$, p, q, r, s, and t are each independently an integer of 0 to 200, p+q+r+s+t is 3 to 500, each unit in parentheses may be randomly arranged, d is independently an integer of 0 to 8, the unit with d may be linear or branched, A is fluorine, hydrogen or a monovalent fluorinated group terminated with $-CF_3$, $-CF_2H$ or $-CH_2F$ group, Z and Z' are each independently a single bond, or a di- to octavalent organic group which may contain nitrogen, oxygen, silicon, phosphorus or sulfur and which may be fluorinated, W is a monovalent organic group terminated with a hydrolyzable group, α and β are each independently an integer of 1 to 7, α+β is 2 to 8, and γ is an integer of 2 to 8, $$A\text{-Rf-}Q\text{-}(Y)_\delta\text{---}B \quad (4)$$

$$\text{Rf-}(Q\text{-}(Y)_\delta\text{---}B)_2 \quad (5)$$

wherein Rf and A are as defined above, Q is a single bond or divalent organic group, δ is an integer of 1 to 10, Y is a divalent organic group having a hydrolyzable group, and B is hydrogen, $C_{1-4}$ alkyl or halogen.

[4]
The water repellent member of [3] wherein the hydrolyzable fluorinated organosilicon compounds having formulae (1) to (5) are the following:

[Chem. 3]

[Chem. 4]
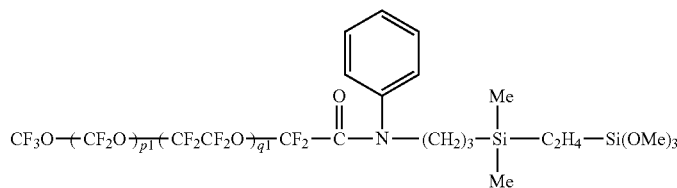

[Chem. 5]
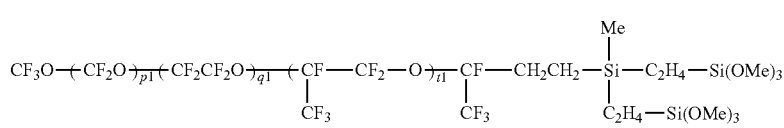

[Chem. 6]
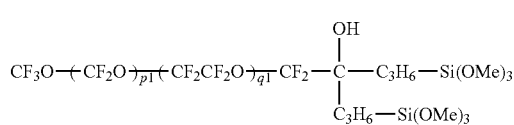

[Chem. 7]
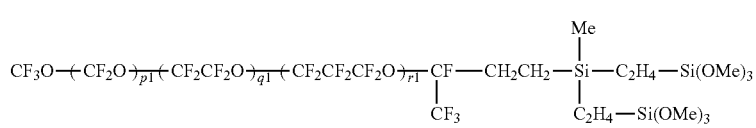

[Chem. 8]
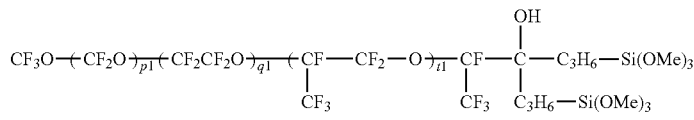

-continued
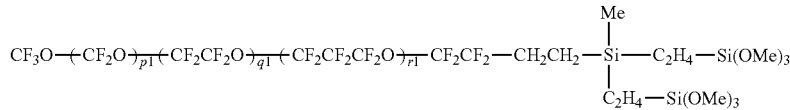
[Chem. 9]
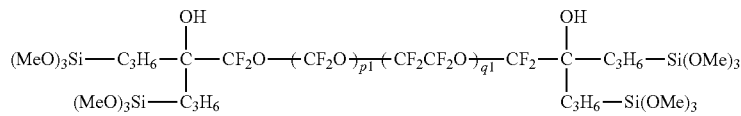
[Chem. 10]
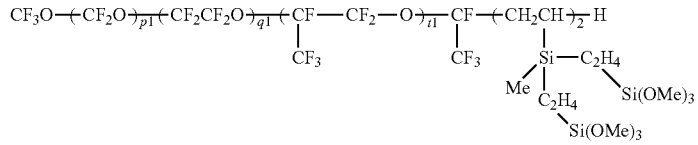
[Chem. 11]
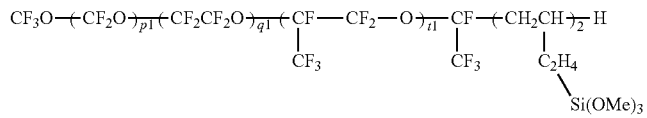
[Chem. 12]
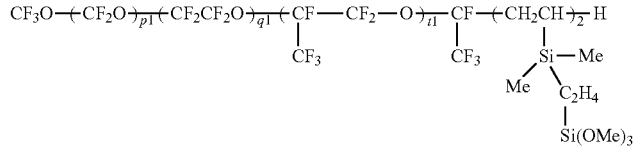
[Chem. 13]
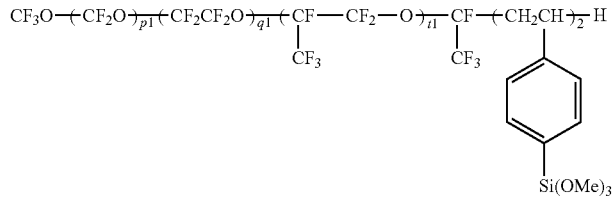
[Chem. 14]
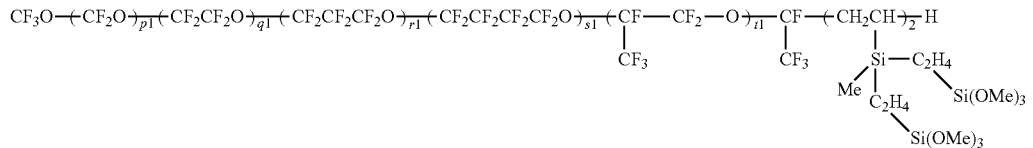
[Chem. 15]
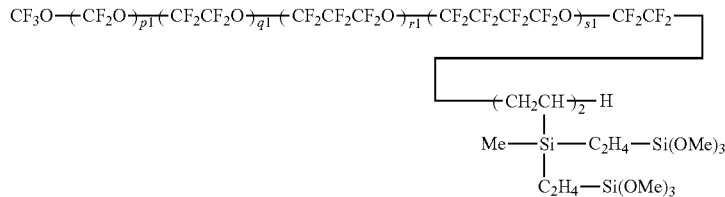
[Chem. 16]
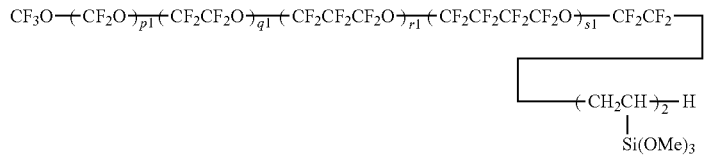
[Chem. 17]
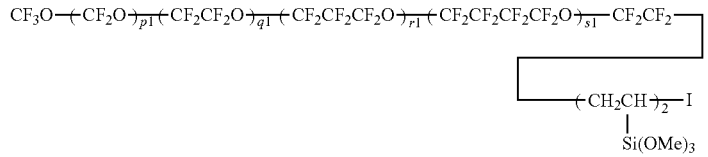
[Chem. 18]

-continued

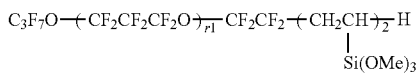
[Chem. 19]

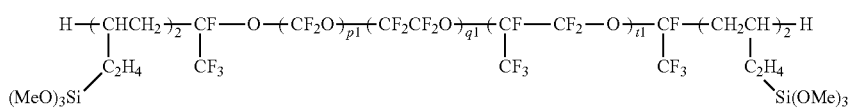
[Chem. 20]

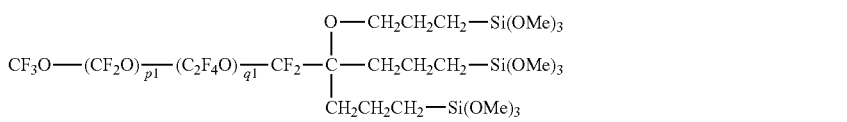
[Chem. 21]

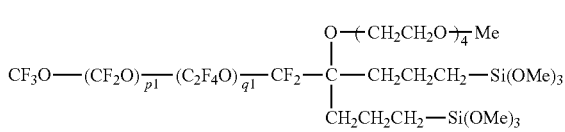
[Chem. 22]

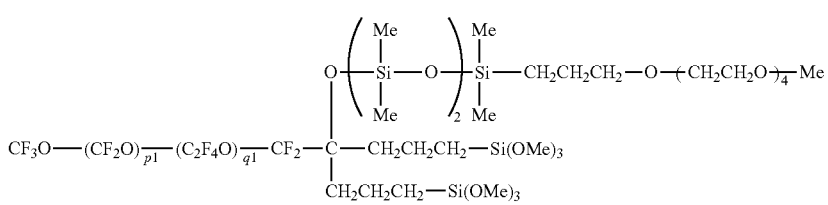
[Chem. 23]

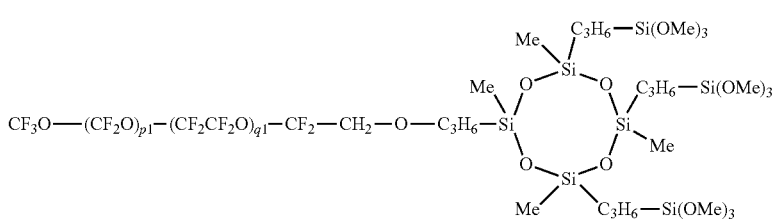
[Chem. 24]

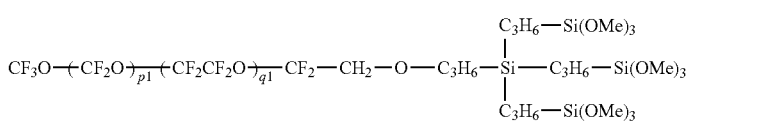
[Chem. 25]

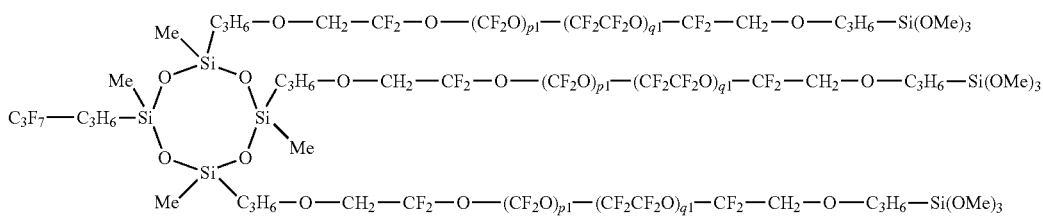
[Chem. 26]

wherein Me is methyl, p1, q1, r1, s1, and t1 are each independently an integer of 1 to 200, the sum of p1, q1, r1, s1, and t1 is 3 to 500, each unit in parentheses may be randomly arranged.

[5]
The water repellent member of any one of [1] to [4] wherein the silica nanoparticles have an average particle size of up to 30 nm.

[6]
The water repellent member of any one of [1] to [5] wherein the silica layer containing at least 50% by weight of silica nanoparticles further contains 0.1 to 50% by weight of nanoparticles of at least one type selected from titanium oxide nanoparticles, platinum nanoparticles, and tin oxide nanoparticles having an average particle size of up to 30 nm.

[7]
The water repellent member of any one of [1] to [6] wherein the substrate is of a metal oxide, metal, resin, ceramic, quartz, glass, sapphire, or diamond.

[8]
A method for preparing the water/oil repellent layer-bearing water repellent member of any one of [1] to [7], the method comprising the steps of wet coating a dispersion of silica nanoparticles in a solvent onto an outer surface of a substrate, drying the dispersion to remove the solvent and to form a silica layer, wet coating a solution of a fluorinated organosilicon compound in a solvent onto an outer surface of the silica layer, and drying the solution to remove the solvent and to cure the fluorinated organosilicon compound.

Advantageous Effects of Invention

According to the invention, there is provided a water repellent member having an antifouling layer with improved water/oil repellent properties tightly adhered to its surface. The method for preparing the water repellent member enables to form the relevant layer by the wet process (e.g., spraying, dipping, brush coating or spin coating) without resorting essentially to the vacuum process or high-temperature heating process. The water repellent member and the method are useful in a variety of applications, for example, articles which must have an antifouling surface, typically electronic instrument housings, wearable terminals, kitchen wares, sanitary wares, transportation vehicle bodies, touch panel displays, and the like.

DESCRIPTION OF EMBODIMENTS

Now the invention is described in detail.

The invention provides a water repellent member comprising a substrate having an outer surface, a silica layer disposed on the substrate outer surface, containing at least 50% by weight of silica nanoparticles, and having a thickness of 1 nm to 5 µm, and a water/oil repellent layer disposed on an outer surface of the silica layer, composed mainly of a cured product of a fluorinated organosilicon compound, and having a thickness of 0.5 to 30 nm, which is prepared, for example, by a method comprising the steps of wet coating a dispersion of silica nanoparticles in a solvent (nano-silica dipersion) onto the outer surface of any of various substrates, drying the dispersion to remove the solvent and to form a silica layer on the substrate outer surface, wet coating a solution of a fluorinated organosilicon compound in a solvent (antifouling coating agent) onto an outer surface of the silica layer, and drying the solution to remove the solvent and to cure the fluorinated organosilicon compound, thereby forming a water/oil repellent layer on the outer surface of the silica layer.

The substrate which can be used herein is not particularly limited and is preferably selected from metal oxides, metals, resins, ceramics, quartz, glass, sapphire, and diamond.

Suitable metal oxides include SiO, $SiO_2$, $Al_2O_3$, ITO, $In_2O_3$, $SnO_2$, $ZrO_2$, $TiO_2$, $Ti_2O_3$, $Ti_4O_7$, $Ti_3O_5$, $Nb_2O_5$, $Ta_2O_5$, $Y_2O_3$, $WO_3$, $HfO_2$, and $La_2Ti_2O_7$.

Suitable metals include magnesium, magnesium alloys, titanium, titanium alloys, chromium, iron, nickel, cobalt, copper, zinc, yttrium, zirconium, niobium, molybdenum, ruthenium, rhodium, palladium, silver, tungsten, platinum, gold, stainless steel, aluminum, aluminum alloys, duralumin, and Hastelloy.

Suitable resins include thermoplastic resins and thermosetting resins. Specifically stated, suitable thermoplastic resins include celluloid, cellulose acetate, cellulose propionate, cellulose butyrate, aliphatic polyamides such as nylon 6, nylon 66, nylon 12, aromatic polyamides, ABS, AS resins, polystyrene, polyolefins such as polyethylene (low density or high density) and polypropylene, polyvinyl chloride, polyvinylidene chloride, ethylene-vinyl acetate copolymers, polyvinyl alcohol, polyacetal, saturated polyesters such as polycarbonate, polyethylene terephthalate, polybutylene terephthalate, aromatic polyesters, polyether ketones, polyether ether ketones, polysulfone, polyether sulfone, polyether imide, polyarylate, polymethylpentene, ionomers, liquid crystal polymers, polyimides, polyamide imides, fluoro-resins, polyphenylene sulfide, (modified) polyphenylene oxide, thermoplastic polyurethane. Suitable thermosetting resins include epoxy resins, unsaturated polyesters, thermosetting polyurethane, polyimide, diethylene glycol bisallyl carbonate polymers (commonly known as CR-39), (co)polymers of di(meth)acrylate of (halogenated) bisphenol A, (co)polymers of urethane-modified di(meth)acrylate of (halogenated) bisphenol A, and copolymers of diacrylate compounds or vinyl benzyl alcohol with unsaturated thiol compounds.

The silica layer disposed on the outer surface of the substrate contains at least 50% by weight of silica nanoparticles and has a thickness of 1 nm to 5 µm. The silica layer may be formed by wet coating a dispersion of silica nanoparticles in a solvent (nano-silica dispersion) onto the outer surface of a substrate, and drying the dispersion to remove the solvent.

Preferably, the silica nanoparticles have an average particle size of up to 30 nm, more preferably up to 20 nm, even more preferably up to 10 nm, and most preferably up to 5 nm. If silica nanoparticles have a larger average particle size, the number of contacts between the substrate and silica nanoparticles is reduced, with the risk that the adhesion to the substrate is degraded. The lower limit of average particle size is typically at least 0.1 nm, preferably at least 0.5 nm. As used herein, the average particle size is determined, for example, as a cumulative weight average diameter D50 (or median diameter) in particle size distribution measurement by the laser light diffraction method.

The content of silica nanoparticles in the silica layer between the substrate and the fluorinated layer (water/oil repellent layer) is 50 to 100% by weight, preferably 60 to 100% by weight. If the content is less than 50% by weight, there are less contacts between silica nanoparticles, leading to degraded durability. On the other hand, the silica nanoparticles can account for 100% by weight. Since voids are left in a layer of silica nanoparticles alone, the density of the layer may be increased by mixing other particles.

Suitable other particles to be mixed with the silica nanoparticles include nanoparticles of titanium oxide, tin oxide, silver, platinum, copper, alumina, calcium oxide, magnesium oxide, manganese oxide, nickel oxide, zirconium oxide and multi-component oxides, having an average particle size of preferably up to 30 nm, more preferably up to 20 nm, even more preferably 1 to 10 nm. Of these, nanoparticles of titanium oxide, platinum and tin oxide are preferred. The other particles may be used alone or in admixture of two or more types. When other particles are used, they preferably account for 0.1 to 50% by weight, more preferably 1 to 20% by weight of all particles (i.e., total of silica nanoparticles and other particles) of which the silica layer is composed.

In the nano-silica dispersion, additives such as UV absorbers, light stabilizers, antioxidants, leveling agents, anti-foaming agents, pigments, dyes, dispersants, antistatic agents, anti-fogging agents, and surfactants may be used if necessary.

The solvent for dispersing silica nanoparticles is preferably deionized water, methanol or ethanol. The solvent is not particularly limited and may be selected in view of substrate wettability and boiling point. In the dispersion of silica nanoparticles in the solvent, the concentration of silica nanoparticles is preferably 0.01 to 10% by weight, more preferably 0.1 to 1% by weight. If the concentration is too low, more uncoated areas may be left. If the concentration is too high, secondary agglomeration of silica nanoparticles can occur.

Now a silica layer may be formed by coating the dispersion of silica nanoparticles in the solvent (nano-silica dispersion) onto a substrate surface by a wet coating process, specifically dipping, brush coating, spin coating, spray coating, or flow coating, and then drying off the solvent. When it is desired to increase the density of the silica layer, the coating may be heated at a temperature in the range of 50 to 500° C. which does not affect the substrate for 10 minutes to 24 hours.

The silica layer disposed on the substrate surface typically has a thickness of 1 nm to 5 μm, preferably 2 nm to 0.5 μm, more preferably 2 nm to 30 nm although the thickness is selected as appropriate depending on a particular substrate. As used herein, the thickness may be measured by the X-ray reflection method.

Next, an antifouling surface layer is formed by coating an antifouling coating agent (i.e., a solution of a fluorinated organosilicon compound in a solvent) onto the outer surface of the silica layer, and drying the solution to remove the solvent and to cure the antifouling coating agent. The antifouling coating agent is based on a fluorinated organo- —CF(CF$_3$)CF$_2$O—
—CF$_2$CF$_2$CF$_2$CF$_2$O—
—CF$_2$CF$_2$CF$_2$CF$_2$CF$_2$O—
—C(CF$_3$)$_2$O—

Most preferably, the (poly)fluorooxyalkylene structure is —(CF$_2$)$_d$—O—(CF$_2$O)$_p$(CF$_2$CF$_2$O)$_q$(CF$_2$CF$_2$CF$_2$O)$_r$(CF$_2$CF$_2$CF$_2$CF$_2$O)$_s$(CF(CF$_3$)CF$_2$O)$_t$—(CF$_2$)$_d$—, wherein p, q, r, s, and t are each independently an integer of 0 to 200, preferably p is an integer of 5 to 100, q is an integer of 5 to 100, r is an integer of 0 to 100, s is an integer of 0 to 50, t is an integer of 0 to 100, and p+q+r+s+t is an integer of 3 to 500, preferably an integer of 10 to 100. Each unit in parentheses may be randomly arranged. The subscript d is independently an integer of 0 to 8, preferably an integer of 0 to 5, more preferably an integer of 0 to 2, and the unit with d may be linear or branched. Specific examples are shown by the following structures.

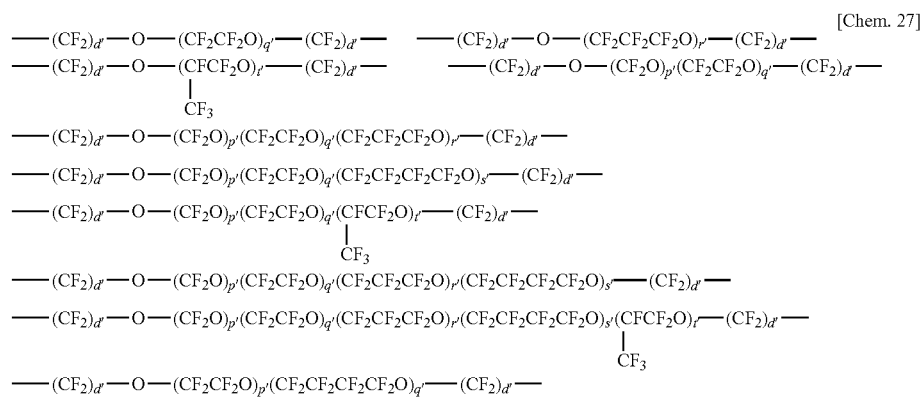

[Chem. 27]

silicon compound. Any of the fluorinated organosilicon compounds may be used which are described in JP-A 2007-197425, JP-A 2007-297589, JP-A 2007-297543, JP-A 2008-088412, JP-A 2008-144144, JP-A 2010-031184, JP-A 2010-047516, JP-A 2011-116947, JP-A 2011-178835, JP-A 2014-084405, JP-A 2014-105235, JP-A 2013-253228, JP-A 2014-218639, and WO 2013/121984 (Patent Documents 1, 4 to 16).

The fluorinated organosilicon compound is described below in further detail.

The fluorinated organosilicon compound (or fluorine-containing organosilicon compound) used herein is preferably a fluorinated organosilicon compound having at least one hydrolyzable group. More preferably the compound has a hydrolyzable group, typically C$_{1-12}$ alkoxy or alkoxyalkoxy group in the molecule and fluorine. The fluorinated organosilicon compound is preferably a compound having a fluorooxyalkylene group. The fluorooxyalkylene group refers to a compound of (poly)fluorooxyalkylene structure having a plurality of repeating units: —C$_j$F$_{2j}$O— bonded wherein j is an integer of at least 1, preferably 1 to 6, more preferably 1 to 4. Especially, the structure may have 3 to 500, preferably 15 to 200, more preferably 20 to 100, even more preferably 25 to 80 repeating units.

The repeating units: —C$_j$F$_{2j}$O— may be linear or branched. Examples include the following units while repeating units of more than one type may be bonded.

—CF$_2$O—
—CF$_2$CF$_2$O—
—CF$_2$CF$_2$CF$_2$O—

Herein p', q', r', s', and t' are each independently an integer of 1 to 200, the sum of p', q', r', s', and t' is 3 to 500, each unit in parentheses may be randomly arranged, d' is independently an integer of 0 to 5, and the unit with d' may be linear or branched.

More preferably, the fluorinated organosilicon compound used herein is a hydrolyzable fluorinated organosilicon compound (or hydrolyzable fluorine-containing organosilicon compound) having any one of the general formulae (1) to (5). The compounds may be used alone or in admixture.

$$(A\text{-}Rf)_\alpha\text{—}ZW_\beta \quad (1)$$

$$Rf\text{—}(ZW_\beta)_2 \quad (2)$$

$$Z'\text{—}(Rf\text{—}ZW_\beta)_\gamma \quad (3)$$

$$A\text{-}Rf\text{-}Q\text{-}(Y)_\delta\text{—}B \quad (4)$$

$$Rf\text{-}(Q\text{-}(Y)_\delta\text{—}B)_2 \quad (5)$$

In formulae (1) to (5), Rf is —(CF$_2$)$_d$—O—(CF$_2$O)$_p$(CF$_2$CF$_2$O)$_q$(CF$_2$CF$_2$CF$_2$O)$_r$(CF$_2$CF$_2$CF$_2$CF$_2$O)$_s$(CF(CF$_3$)CF$_2$O)$_t$—(CF$_2$)$_d$—, p, q, r, s, and t are each independently an integer of 0 to 200, p+q+r+s+t is 3 to 500, each unit in parentheses may be randomly arranged, d is independently an integer of 0 to 8, the unit with d may be linear or branched. "A" is fluorine, hydrogen or a monovalent fluorinated group terminated with —CF$_3$, —CF$_2$H or —CH$_2$F group, Z and Z' are each independently a single bond, or a di- to octavalent organic group which may contain nitrogen, oxygen, silicon, phosphorus or sulfur and which may be fluorinated, W is a monovalent organic group terminated with a hydrolyzable group. The subscripts α and β are each independently an integer of 1 to 7, preferably α is an integer of 1 to 3, more preferably 1, β is an integer of 1 to 3, α+β is an integer of 2 to 8, preferably an integer of 2 to 4, and γ is an integer of 2 to 8, preferably 2.

Q is a single bond or divalent organic group, δ is independently an integer of 1 to 10, Y is a divalent organic group having a hydrolyzable group, and B is hydrogen, $C_{1-4}$ alkyl or halogen.

In formulae (1) to (5), Rf is the above-described (poly)fluorooxyalkylene structure: $—(CF_2)_d—O—(CF_2O)_p(CF_2CF_2O)_q(CF_2CF_2CF_2O)_r(CF_2CF_2CF_2CF_2O)_s(CF(CF_3)CF_2O)_t—(CF_2)_d—$, examples of which are as illustrated above.

In formulae (1) and (4), "A" is fluorine, hydrogen or a monovalent fluorinated group terminated with $—CF_3$, $—CF_2H$ or $—CH_2F$ group. Inter alia, $—CF_3$, $—CF_2CF_3$ and $—CF_2CF_2CF_3$ groups are preferred.

In formulae (1) to (3), Z and Z' are each independently a single bond, or a di- to octavalent organic group which may contain nitrogen, oxygen, silicon, phosphorus or sulfur and which may be fluorinated. The organic group may be represented by $(L)_e$-M wherein e is an integer of 1 to 7, preferably 1 to 3.

Herein L is a single bond, oxygen, sulfur or a divalent organic group. In formulae (1) to (3), L in Z is a linking group between Rf group and M group (or W group), and L in Z' is a linking group between M group (or Rf group) and Rf group. The divalent organic group is preferably an unsubstituted or substituted $C_{2-12}$ divalent organic group which may contain one or more selected from the group consisting of amide bond, ether bond, ester bond, diorganosilylene groups such as dimethylsilylene, and groups of the formula: $—Si[OH][(CH_2)_fSi(CH_3)_3]—$ wherein f is an integer of 2 to 4, more preferably an unsubstituted or substituted $C_{2-12}$ divalent hydrocarbon group which may contain the foregoing structure.

Examples of the unsubstituted or substituted $C_{2-12}$ divalent hydrocarbon group include alkylene groups such as ethylene, propylene (trimethylene or methylethylene), butylene (tetramethylene or methylpropylene), hexamethylene, and octamethylene, arylene groups such as phenylene, and combinations of two or more such groups, such as alkylene-arylene groups. In these groups, some or all of carbon-bonded hydrogen atoms may be substituted by halogen atoms such as fluorine. Inter alia, unsubstituted or substituted $C_{2-4}$ alkylene groups or phenylene groups are preferred.

Examples of the divalent organic group L include groups of the following structure, and combinations of two or more such groups.

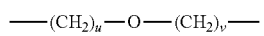
[Chem. 28]

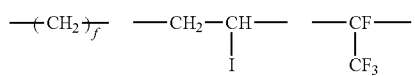
[Chem. 29]

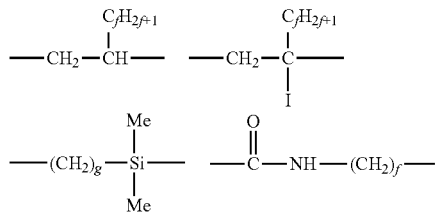

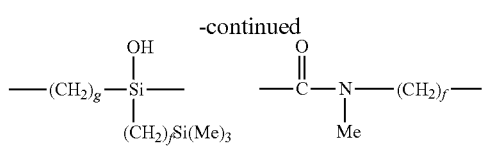
[Chem. 30]

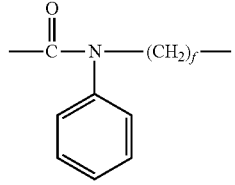

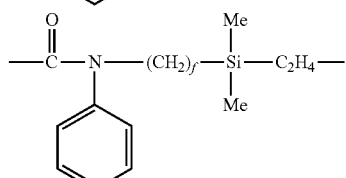

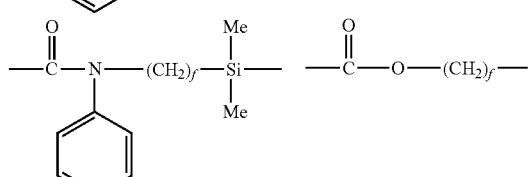

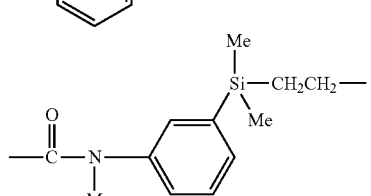
[Chem. 31]

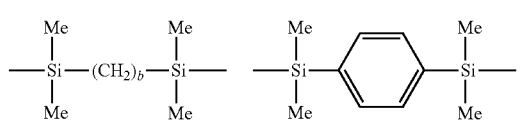

Herein f and g each are an integer of 2 to 4, b is an integer of 2 to 6, preferably 2 to 4, u and v each are an integer of 1 to 4, and Me is methyl.

Also, M is a single bond, nitrogen, silicon, carbon, phosphorus or a di- to octavalent organic group. Specifically, M is a single bond, divalent group $—R^1_2C—$, divalent group $—R^3_2Si—$, divalent group $—NR^4—$, trivalent group $—N=$, trivalent group $—P=$, trivalent group $—PO=$, trivalent group $—R^1C=$, trivalent group $—R^3Si=$, trivalent group $—N=$, tetravalent group $—C\equiv$, tetravalent group $—O—C\equiv$, tetravalent group $—Si\equiv$, or di- to octavalent siloxane residues. In formulae (1) to (3), M in Z is a linking group between L (or Rf group) and W group, and M in Z' is a group to link with Rf group via L.

Herein, $R^1$ is each independently a $C_{1-3}$ alkyl group, hydroxyl group, group having repeating unit of $C_{1-3}$ oxyalkylene group which may have a straight, branched or cyclic organopolysiloxane structure of 2 to 51 silicon atoms, or silyl ether group represented by $R^2_3SiO—$. $R^2$ is each independently hydrogen, a $C_{1-3}$ alkyl group, $C_{6-10}$ aryl group such as phenyl, or $C_{1-3}$ alkoxy group. $R^3$ is each independently a $C_{1-3}$ alkyl group, $C_2$ or $C_3$ alkenyl group, $C_{1-3}$ alkoxy group, or chloro. $R^4$ is a $C_{1-3}$ alkyl group or $C_{6-10}$ aryl group such as phenyl. When M is a siloxane residue, it preferably has a straight, branched or cyclic organopolysiloxane structure of 2 to 51 silicon atoms, preferably 2 to 13 silicon atoms, more preferably 2 to 11 silicon atoms, even more preferably 2 to 5 silicon atoms. The organopolysiloxane having an alkyl group of 1 to 8 carbon atoms, more preferably 1 to 4 carbon atoms such as methyl, ethyl, propyl or butyl, or phenyl group is preferred. The organopolysiloxane may also contain a silalkylene structure in which two silicon atoms are linked by an alkylene group, that is, Si—(CH$_2$)$_n$—Si wherein n is an integer of 2 to 6, preferably an integer of 2 to 4.

The following are exemplary of M defined above.

[Chem. 32]

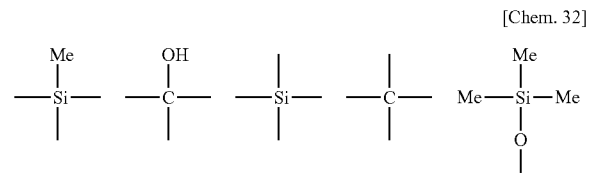

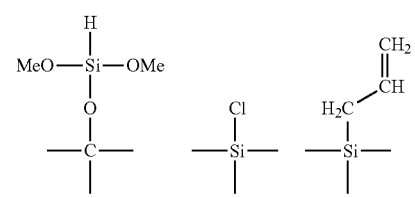

[Chem. 33]

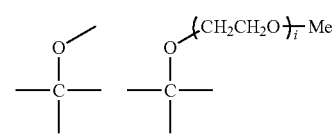

[Chem. 34]

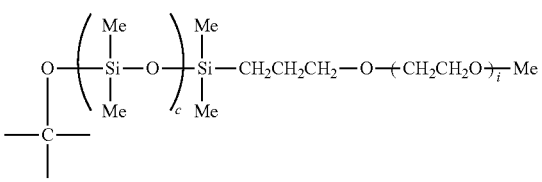

[Chem. 35]

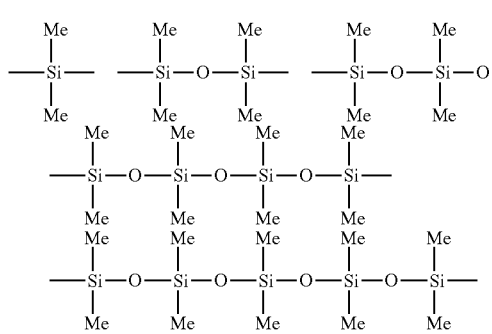

[Chem. 36]

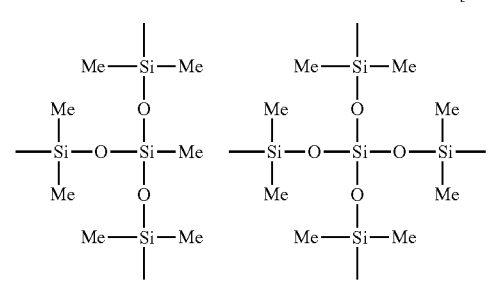

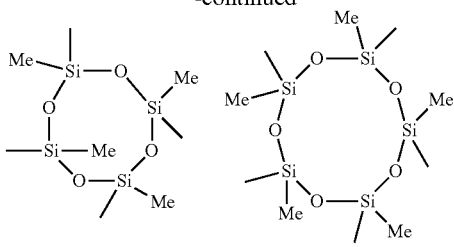

[Chem. 37]

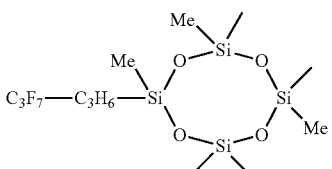

[Chem. 38]

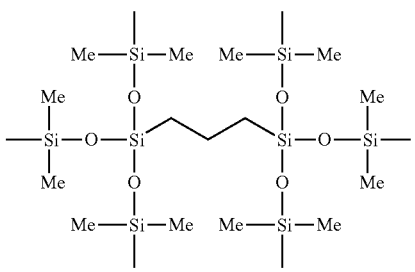

Herein i is an integer of 1 to 20, preferably 1 to 10, c is an integer of 1 to 50, preferably 1 to 12, more preferably 1 to 10, even more preferably 1 to 4, and Me is methyl.

In formulae (1) to (3), W is a monovalent organic group terminated with a hydrolyzable group, preferably represented by the following formula.

[Chem. 39]

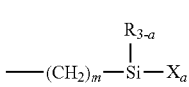

Herein R is C$_{1-4}$ alkyl or phenyl, X is a hydrolyzable group, a is 2 or 3, and m is an integer of 0 to 10.

In the above formula, examples of the hydrolyzable group X include alkoxy groups of 1 to 12 carbon atoms, especially 1 to 10 carbon atoms such as methoxy, ethoxy, propoxy and butoxy, alkoxyalkoxy groups of 2 to 12 carbon atoms, especially 2 to 10 carbon atoms such as methoxymethoxy and methoxyethoxy, acyloxy groups of 1 to 10 carbon atoms such as acetoxy, alkenyloxy groups of 2 to 10 carbon atoms such as isopropenoxy, halogen groups such as chloro, bromo and iodo, and amino groups. Inter alia, methoxy and ethoxy groups are preferred.

R is C$_{1-4}$ alkyl such as methyl or ethyl, or phenyl, with methyl being preferred.

The subscript "a" is 2 or 3. From the standpoints of reactivity and substrate adhesion, "a" is preferably equal to 3. The subscript m is an integer of 0 to 10, preferably an integer of 2 to 8, more preferably 2 or 3.

In formulae (1) to (3), examples of the structures represented by (—)$_\alpha$ZW$_\beta$ and —ZW$_\beta$ include the following structures.

[Chem. 40]

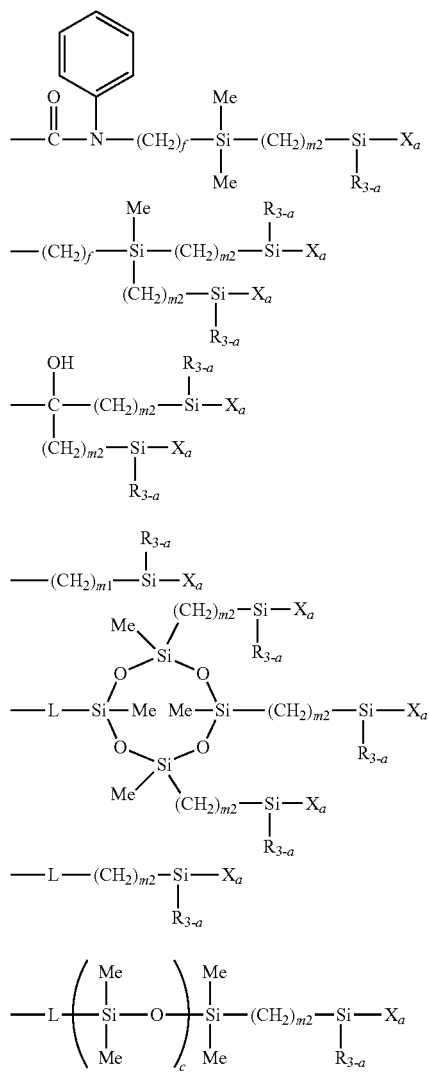

[Chem. 41]

[Chem. 42]

Herein, L, R, X, f, c, and a are as defined above; m1 is an integer of 0 to 10, preferably an integer of 2 to 8, m2 is an integer of 1 to 10, preferably an integer of 2 to 8, and Me is methyl.

In formulae (4) and (5), Q is a single bond or divalent organic group, that is a linking group between Rf group and Y group. The divalent organic group represented by Q is preferably an unsubstituted or substituted $C_{2-12}$ divalent organic group which may contain at least one structure selected from amide bond, ether bond, ester bond, diorganosilylene groups such as dimethylsilylene, and groups represented by —Si[OH][(CH$_2$)$_f$Si(CH$_3$)$_3$]—wherein f is an integer of 2 to 4, more preferably an unsubstituted or substituted $C_{2-12}$ divalent hydrocarbon group which may contain the aforementioned structure.

Examples of the unsubstituted or substituted $C_{2-12}$ divalent hydrocarbon group are as exemplified above for the unsubstituted or substituted $C_{2-12}$ divalent hydrocarbon group L.

Examples of the divalent organic group Q include groups of the following structure.

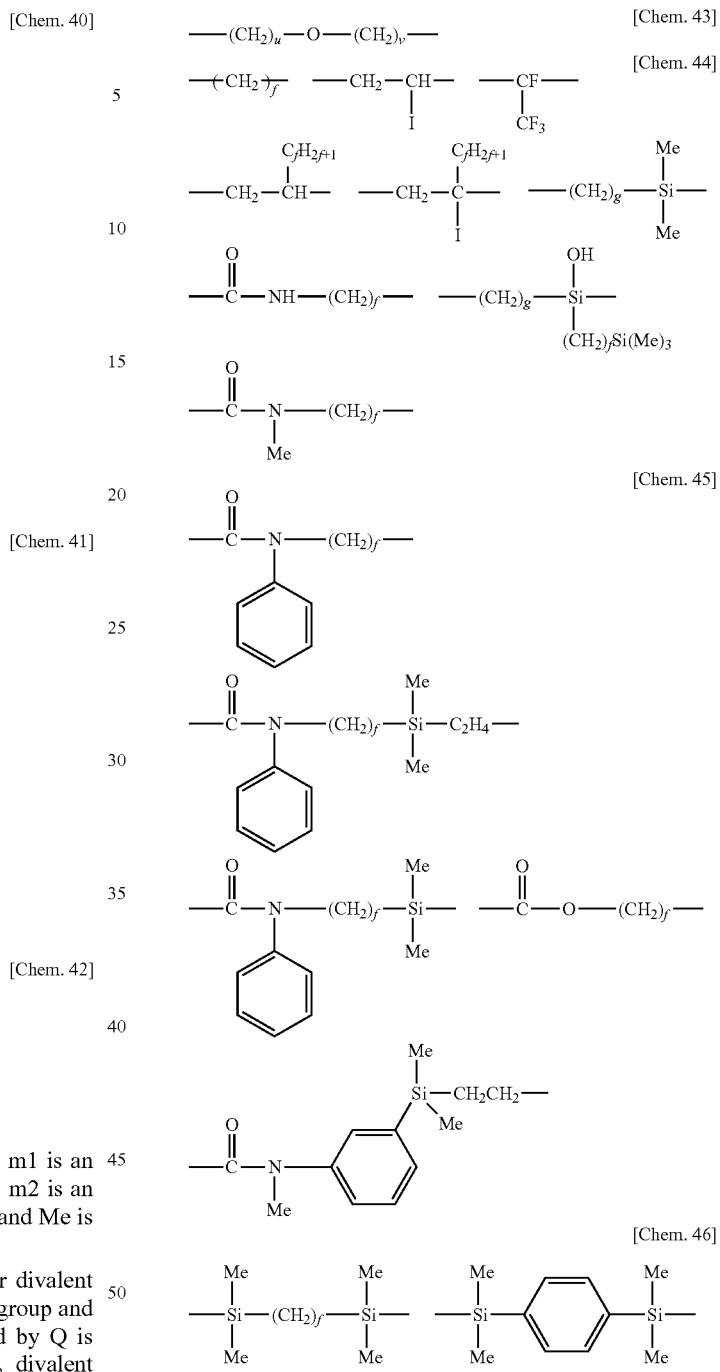

[Chem. 43]

[Chem. 44]

[Chem. 45]

[Chem. 46]

Herein f and g each are an integer of 2 to 4, u and v each are an integer of 1 to 4, and Me is methyl.

In formulae (4) and (5), Y is each independently a divalent group having a hydrolyzable group, preferably a group of the following formula.

[Chem. 47]

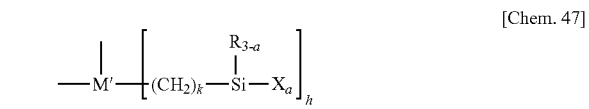

Herein R, X, and a are as defined above; k is an integer of 0 to 10, preferably an integer of 2 to 8, more preferably an integer of 3 to 8; h is an integer of 1 to 6, preferably 1 or 2. M' is an unsubstituted or substituted tri- to octavalent, preferably tri- or tetravalent hydrocarbon group, in which some or all of the carbon atoms may be replaced by silicon atoms and some or all of the carbon-bonded hydrogen atoms may be substituted by halogen atoms such as fluorine.

Preferably M' is selected from groups of the following structures.

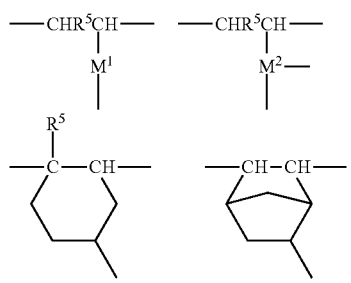
[Chem. 48]

Herein $M^1$ is a single bond, unsubstituted or substituted $C_{1-6}$ divalent hydrocarbon group, or diorganosilylene group such as dimethylsilylene. $M^2$ is a trivalent group of the formula: $-R^1C=$ or trivalent group of the formula: $-R^3Si=$. $R^1$ and $R^3$ are as defined above. $R^5$ is hydrogen or a monovalent hydrocarbon group, typically $C_{1-6}$ alkyl group such as methyl, ethyl or propyl.

Exemplary of $M^1$ are a single bond, phenylene, dimethylsilylene and tetrafluoroethylene. The following is typical of $M^2$.

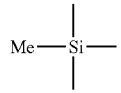
[Chem. 49]

Herein Me is methyl.

For example, Y is selected from the following groups.

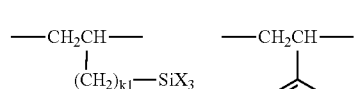
[Chem. 50]

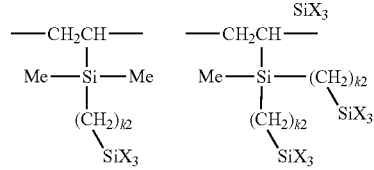

[Chem. 51]

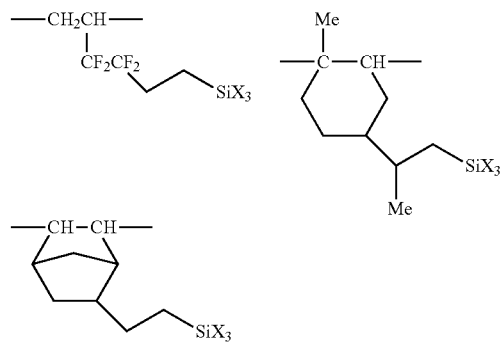

Herein X is as defined above, k1 is an integer of 0 to 10, preferably an integer of 1 to 8, k2 is an integer of 2 to 10, preferably an integer of 2 to 8, and Me is methyl.

In formulae (4) and (5), δ is an integer of 1 to 10, preferably an integer of 1 to 4.

B is each independently selected from hydrogen, $C_{1-4}$ alkyl groups such as methyl, ethyl, propyl and butyl, and halogen atoms such as fluorine, chlorine, bromine and iodine.

Examples of the hydrolyzable fluorinated organosilicon compounds (hydrolyzable fluorine-containing organosilicon compounds) having formulae (1) to (5) include the structures shown below.

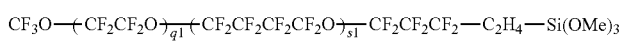
[Chem. 52]

[Chem. 53]
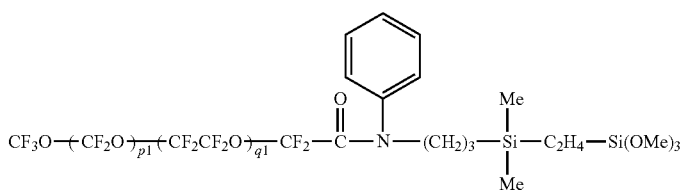

[Chem. 54]
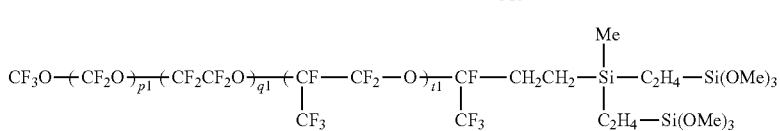

[Chem. 55]
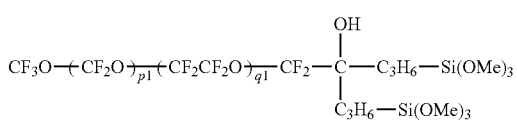

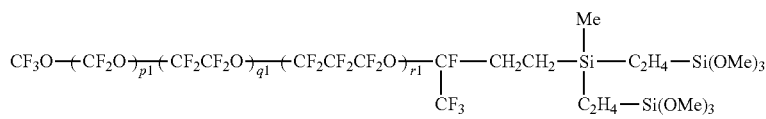
[Chem. 56]
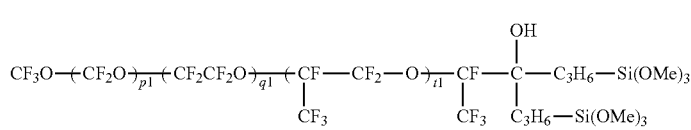
[Chem. 57]
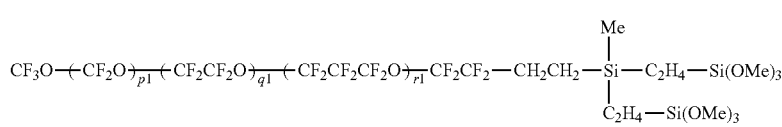
[Chem. 58]
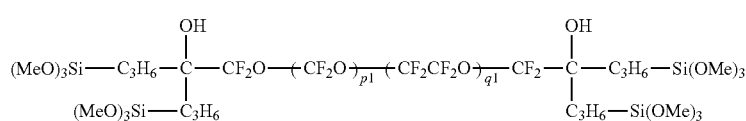
[Chem. 59]
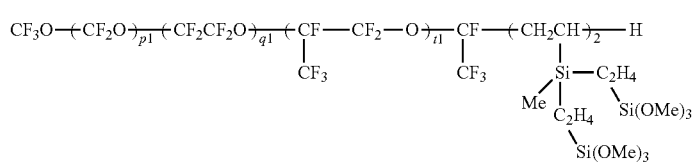
[Chem. 60]
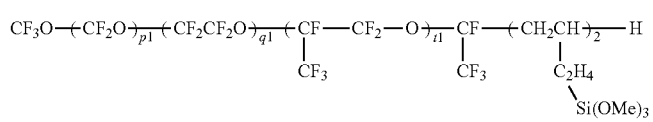
[Chem. 61]
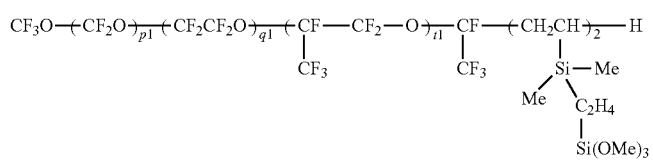
[Chem. 62]
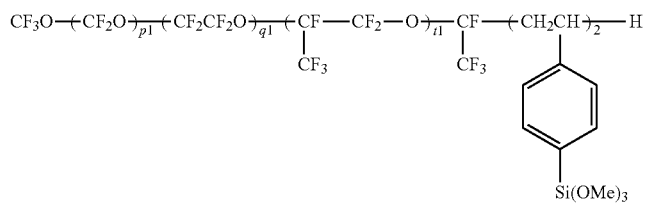
[Chem. 63]
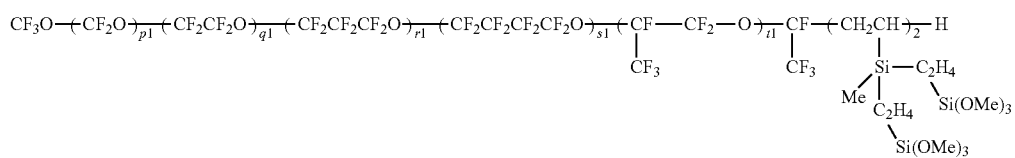
[Chem. 64]
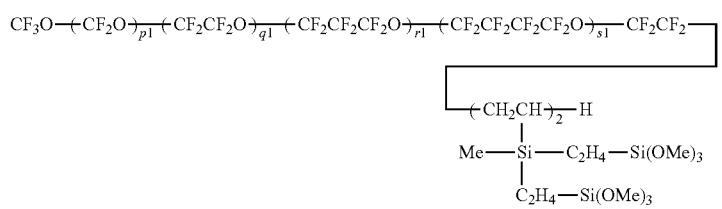
[Chem. 65]

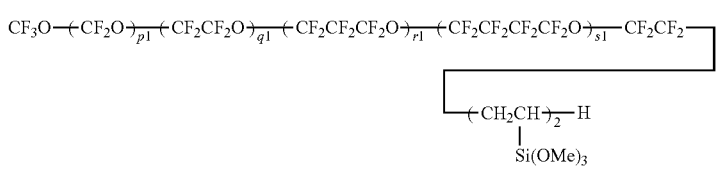
[Chem. 66]
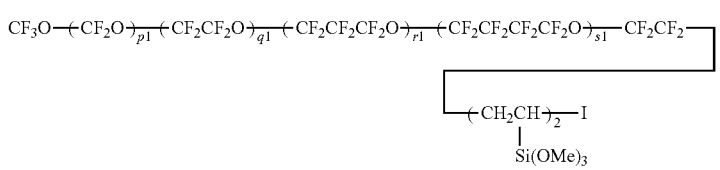
[Chem. 67]
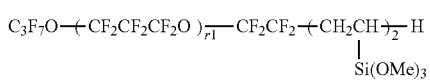
[Chem. 68]
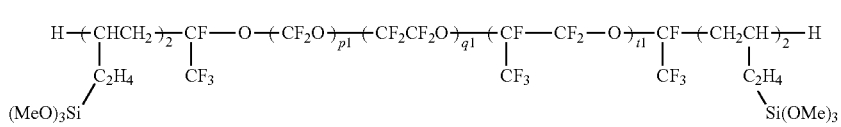
[Chem. 69]
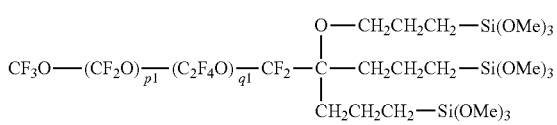
[Chem. 70]
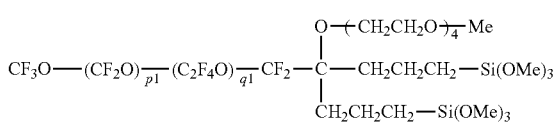
[Chem. 71]
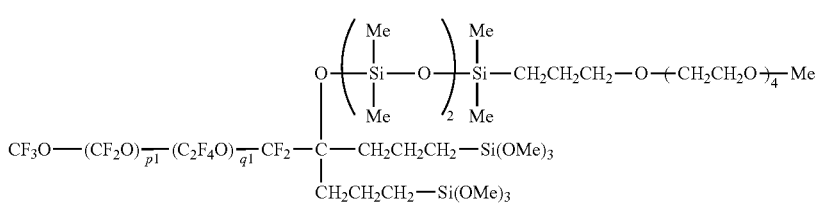
[Chem. 72]
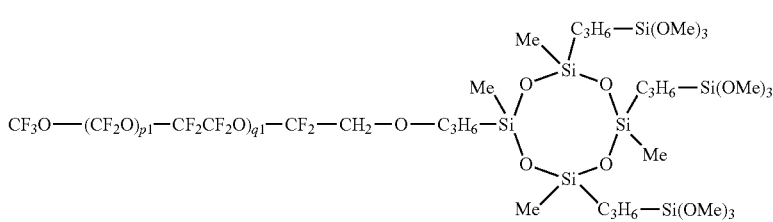
[Chem. 73]
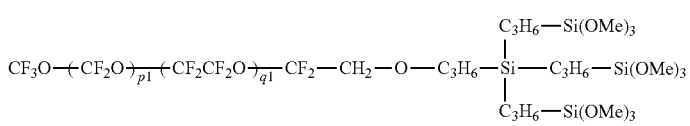
[Chem. 74]
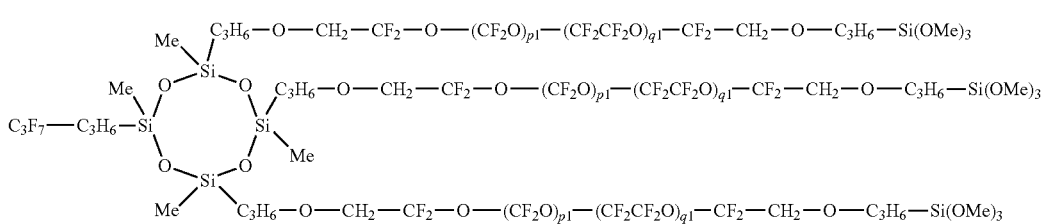
[Chem. 75]

Herein Me is methyl, p1, q1, r1, s1, and t1 are each independently an integer of 1 to 200, the sum of p1, q1, s1, and t1 is 3 to 500, each unit in parentheses may be randomly arranged.

The hydrolyzable fluorinated organosilicon compound (hydrolyzable fluorine-containing organosilicon compound) having any of formulae (1) to (5) may contain such compounds in which some or all of the hydrolyzable groups (X) are hydrolyzed, that is, X is OH group and may further contain such compounds in which some or all of the OH groups are condensed.

Desirably the fluorinated organosilicon compound is previously diluted with a solvent. The solvent used herein is not particularly limited as long as the fluorinated organosilicon compound is uniformly dissolved. Examples include fluorine-modified aliphatic hydrocarbon solvents (e.g., perfluoroheptane and perfluorooctane), fluorine-modified aromatic hydrocarbon solvents (e.g., 1,3-trifluoromethylbenzene), fluorine-modified ether solvents (e.g., methyl perfluorobutyl ether, ethyl perfluorobutyl ether, perfluoro(2-butyltetrahydrofuran)), fluorine-modified alkylamine solvents (e.g., perfluorotributylamine, perfluorotripentylamine), hydrocarbon solvents (e.g., petroleum benzine, toluene, xylene), and ketone solvents (e.g., acetone, methyl ethyl ketone, methyl isobutyl ketone). Of these, fluorine-modified solvents are desirable for solubility and stability, and fluorine-modified ether solvents and fluorine-modified aromatic hydrocarbon solvents are especially preferred.

The foregoing solvents may be used alone or in admixture.

The solvent is preferably used in such amounts that the concentration of the fluorinated organosilicon compound may fall in a range of 0.01 to 50% by weight, more preferably 0.03 to 10% by weight, even more preferably 0.05 to 1% by weight of the antifouling coating agent (solution of the fluorinated organosilicon compound in the solvent).

The antifouling coating agent containing the fluorinated organosilicon compound may be applied to substrates by any well-known processes such as wet coating processes (e.g., brush coating, dipping, spraying and inkjet printing) and evaporation. Although coating and other conditions may accord with the prior art well-known process, it is efficient that the fluorinated organosilicon compound is deposited by the wet coating process because the silica layer is deposited by the wet coating process.

The fluorinated organosilicon compound may be cured at room temperature (20° C±10° C.) for 1 to 24 hours. Cure may be completed within a shorter time by heating at 35 to 200° C. for 10 minutes to 1 hour. Cure under humid conditions (RH 50 to 90%) is preferred for accelerating hydrolysis.

It is noted that the surface of the silica layer on the substrate may be cleaned or activated by plasma treatment, UV treatment or ozone treatment before the antifouling coating agent containing the fluorinated organosilicon compound is coated thereon.

The fluorinated layer (water/oil repellent layer) of the inventive water repellent member has a thickness of 0.5 to 30 nm, preferably 1 to 20 nm. If the layer is too thick, the treating agent may agglomerate together, exacerbating visibility. If the layer is too thin, surface properties and abrasion resistance may be unsatisfactory.

Examples of the inventive water repellent member thus obtained include housings and displays of car navigation systems, tablets, smartphones, mobile phones, digital cameras, digital video cameras, PDAs, portable audio players, car audio players, and video game consoles; optical articles such as eyeglass lenses, camera lenses, sunglasses, medical instruments (e.g., gastroscopes), copiers, PCs, liquid crystal displays, organic EL displays, plasma displays, touch panel displays, protective films, and antireflective films; sanitary wares such as bathtubs and washbowls; kitchen wares such as kitchen counters; windowpanes and headlamp covers of automobiles, trains and aircraft; building exterior members; kitchen building members; waiting rooms; art works; compact disks and DVDs; and bodies of transportation vehicles.

EXAMPLES

Examples and Comparative Examples are shown below for further illustrating the invention although the invention is not limited thereby.

Examples 1 to 5 and Comparative Example

[Formation of Silica Layer]

A silica treating liquid (nano-silica dispersion) of the composition shown in Table 1 was coated onto an outer surface of a duralumin testpiece (A7075P by Standard Testpiece Co., Ltd., specimen substrate of 2 mm thick, 50 mm wide, and 100 mm long) by dipping (dipping for 30 seconds and pulling up at 2.5 mm/s), after which the coating was dried at 150° C. for 1 hour to remove the solvent (deionized water), forming a silica layer of Examples 1 to 5 on the outer surface of the duralumin testpiece or substrate. Table 2 shows the average thickness of the silica layers of Examples 1 to 5 as estimated by the X-ray fluorescence analysis.

TABLE 1

| Blending composition (wt %) | Silica particles A of particle size 2 nm | Silica particles B of particle size 10 nm | Silica particles C of particle size 20 nm | Tin oxide particles of particle size 5 nm | Deionized water |
|---|---|---|---|---|---|
| Treating liquid 1 | 0.3 | 0 | 0 | 0 | 99.7 |
| Treating liquid 2 | 0.6 | 0 | 0 | 0 | 99.4 |
| Treating liquid 3 | 0 | 0.3 | 0 | 0 | 99.7 |
| Treating liquid 4 | 0 | 0 | 0.3 | 0 | 99.7 |
| Treating liquid 5 | 0.3 | 0 | 0 | 0.02 | 99.68 |

The particle size refers to average particle size.

TABLE 2

|  |  | Average thickness (nm) |
|---|---|---|
| Example 1 | Treating liquid 1 | 10 |
| Example 2 | Treating liquid 2 | 28 |
| Example 3 | Treating liquid 3 | 12 |
| Example 4 | Treating liquid 4 | 15 |
| Example 5 | Treating liquid 5 | 25 |

Further, a water/oil repellent layer was formed on the outer surface of each substrate having the silica layer of Examples 1 to 5 formed thereon, by the following method. In Comparative Example 1, a water/oil repellent layer was formed on the outer surface of a duralumin testpiece (substrate) directly without coating the silica treating liquid.

[Formation of Water/Oil Repellent Layer]

Compound 1, shown below, was diluted with a fluorochemical solvent (Novec 7200 by 3M) in a concentration of 0.1 wt % as solids. Using a spray coater (NST-51 by T&K Co., Ltd.), the dilution was sprayed onto the outer surface of the silica layer on each substrate. The coating was dried at 80° C. for 30 minutes to remove the fluorochemical solvent. At the same time, the water/oil repellent layer (Compound 1) was cured to form a cured film, obtaining specimens of Examples 1 to 5 and Comparative Example 1. The water/oil repellent layer had an average thickness of about 15 nm as computed from the F content detected by an X-ray fluorescence analyzer (ZSXmini2 by Rigaku Corp.).

[Compound 1]

[Chem. 76]

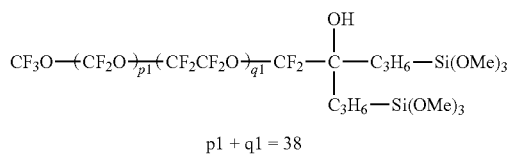

$p1 + q1 = 38$

Herein Me is methyl.

Using the specimens, various properties were evaluated by the following methods. The results are shown in Table 3.

[Water and Oil Repellency]

Using a contact angle meter (DropMaster by Kyowa Interface Science Co., Ltd.), the contact angles of the cured film with water and oleic acid were measured.

[Coefficient of Dynamic Friction]

Using a surface property tester (Shinto Scientific Co., Ltd.), the cured film was measured for a coefficient of dynamic friction with respect to fabric Bemcot (Asahi Kasei Corp.) under the following conditions.
    contact area: 10 mm×30 mm
    load: 100 g

[Sebum Stain Wipe-Off]

Seven panelists transferred sebum on their forehead to the surface of the cured film with the finger, wiped the film surface with fabric Bemcot (Asahi Kasei Corp.), and evaluated wipe-off according to the following criteria.
    A: easy stain wipe-off
    B: stain wipe-off
    C: some oil residues after stain wipe-off
    D: no stain wipe-off

[Abrasion Resistance Test]

Using a both-way wear tester (Heidon 30S, Shinto Scientific Co., Ltd.), an abrasion resistance test was carried out on the cured film under the following conditions. The cured film after the abrasion resistance test was measured for a contact angle with water using a contact angle meter (DropMaster by Kyowa Interface Science Co., Ltd.).
    environmental conditions: 25° C., humidity 40%
    rubbing member:
        tip portion (10 mm×10 mm) of the tester to come in contact with the specimen was wrapped with 8 stacked non-woven fabric sheets, which was secured by rubber band.
    load: 1 kg
    rubbing distance (one way): 30 mm
    rubbing speed: 3,600 mm/min
    reciprocation: 5,000 cycles

TABLE 3

| | Water/oil repellency | | | | Abrasion resistance test |
|---|---|---|---|---|---|
| | Water contact angle (°) | Oleic acid contact angle (°) | Coefficient of dynamic friction | Sebum stain wipe-off | Water contact angle (°) |
| Example 1 | 112 | 70 | 0.05 | A | 110 |
| Example 2 | 115 | 72 | 0.06 | A | 111 |
| Example 3 | 114 | 75 | 0.08 | A | 110 |
| Example 4 | 119 | 76 | 0.09 | A | 102 |
| Example 5 | 112 | 71 | 0.06 | A | 113 |
| Comparative Example 1 | 110 | 65 | 0.10 | C | 35 |

As is evident from the results in Table 3, Examples 1 to 5 exhibited excellent water repellency as demonstrated by an angle of more than 100° before and after the abrasion test, whereas Comparative Example 1 without the silica layer showed a substantial drop of water repellency after the abrasion test. Example 4 using silica particles with an average particle size of 20 nm experienced a larger drop of water repellency after the abrasion test than Examples 1 to 3 and 5 using silica particles with an average particle size of up to 10 nm. This indicates that smaller nanoparticles provide better adhesion to substrates. The addition of tin oxide nanoparticles gives no significant influence on surface properties and abrasion resistance, indicating possible mixing of nanoparticles of various types.

INDUSTRIAL APPLICABILITY

According to the invention, a water repellent member having a cured film with excellent water/oil repellent properties is provided. The water repellent member of the invention is quite useful in the application where deposition of oils and fats is expected.

Even when the invention is applied to articles which are of daily use and frequent touch, for example, electronic instrument housings and kitchen wares, a satisfactory antifouling surface is maintained over a long period of time.

The invention claimed is:

1. A water repellent member comprising:
    a substrate having an outer surface, wherein the substrate is of aluminum or alloy thereof,
    a silica layer disposed on the substrate outer surface, wherein the silica layer consists of (i) 100% by weight of silica nanoparticles having an average particle size of 0.1 nm to 10 nm, or (ii) at least 50% by weight of silica nanoparticles having an average particle size of 0.1 nm to 10 nm and 0.1 to 50% by weight of nanoparticles having an average particle size of 1 nm to 10 nm and selected from titanium oxide, tin oxide, silver, platinum, copper, alumina, calcium oxide, magnesium oxide, manganese oxide, nickel oxide, zirconium oxide and multi-component oxides,
    wherein in (ii), the sum of the silica nanoparticles and the nanoparticles is equal to 100% by weight;
    wherein the silica layer is formed by wet coating and has a thickness of 1 nm to 5 μm, and
    a water/oil repellent layer disposed on an outer surface of the silica layer, wherein the water/oil repellent layer is composed mainly of a cured product of a fluorinated organosilicon compound, and wherein the water/oil repellent layer has a thickness of 0.5 to 30 nm, and
    wherein the fluorinated organosilicon compound is at least one compound selected from the following hydrolyzable organosilicon compounds:

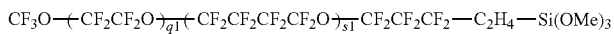
[Chem. 1]
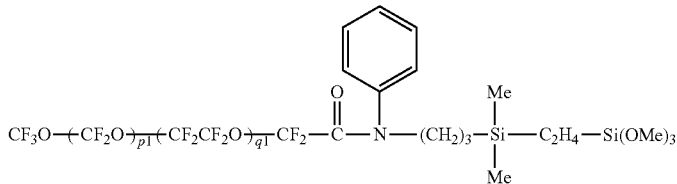
[Chem. 2]
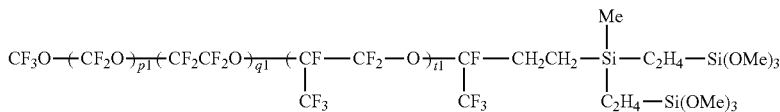
[Chem. 3]
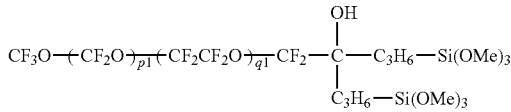
[Chem. 4]
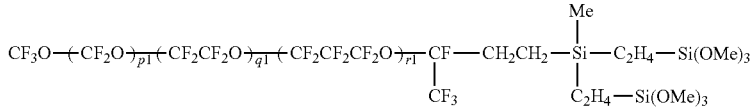
[Chem. 5]
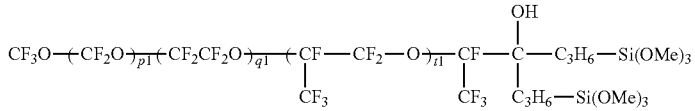
[Chem. 6]
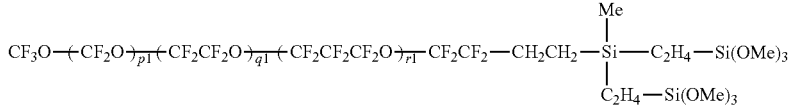
[Chem. 7]
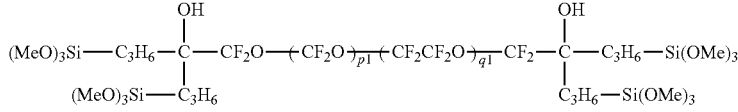
[Chem. 8]
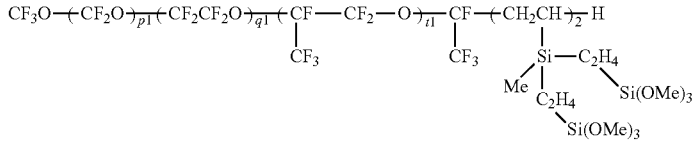
[Chem. 9]
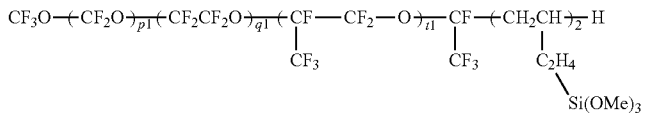
[Chem. 10]
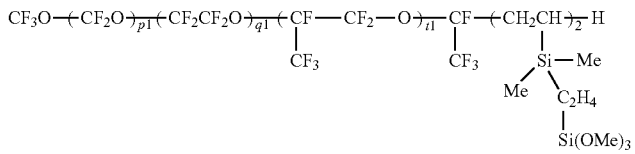
[Chem. 11]

-continued
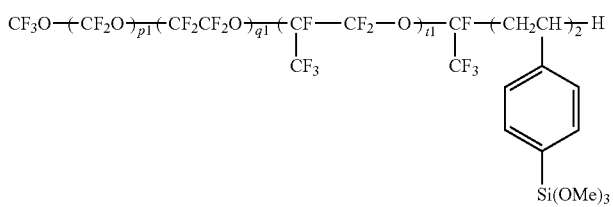
[Chem. 12]
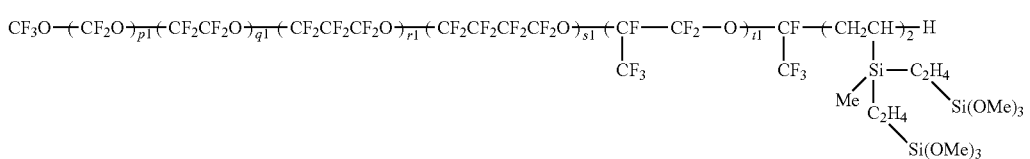
[Chem. 13]
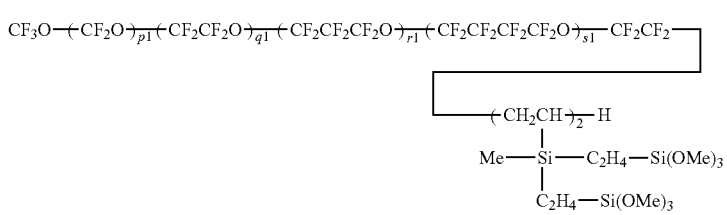
[Chem. 14]
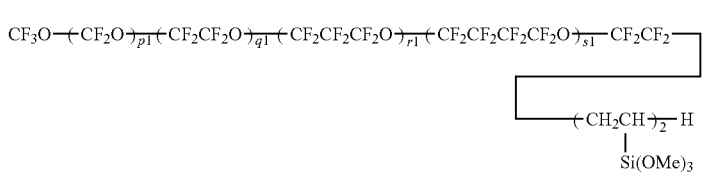
[Chem. 15]
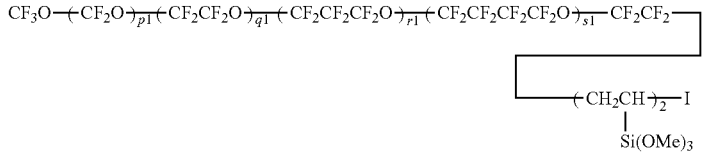
[Chem. 16]
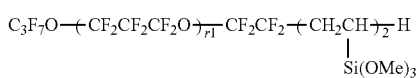
[Chem. 17]
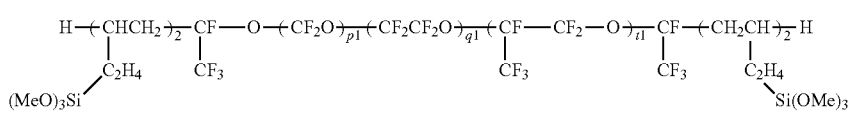
[Chem. 18]
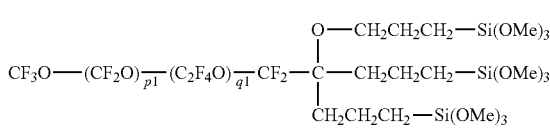
[Chem. 19]
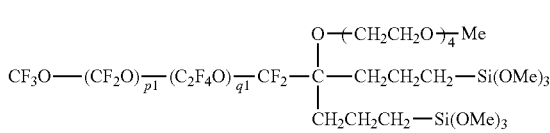
[Chem. 20]
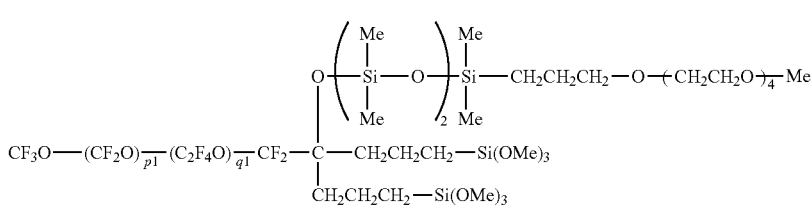
[Chem. 21]

-continued

[Chem. 22]
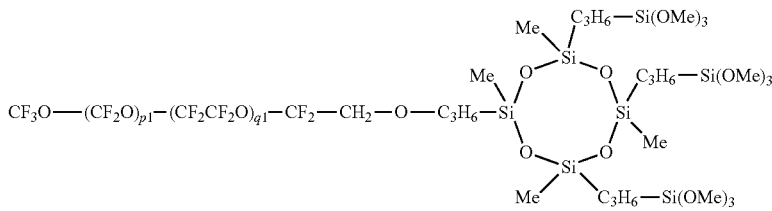

[Chem. 23]
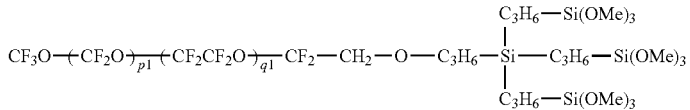

[Chem. 24]
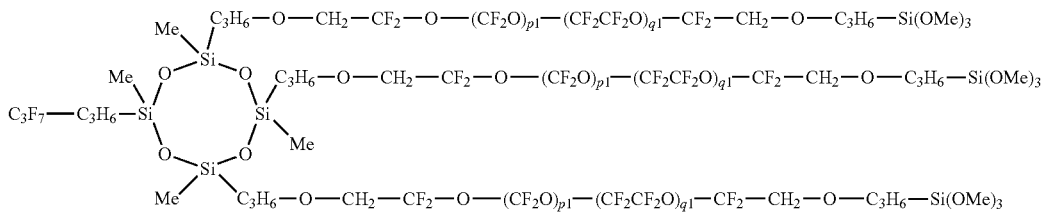

wherein Me is methyl, p1, q1, r1, s1, and t1 are each independently an integer of 1 to 200, wherein the sum of p1, q1, r1, s1, and t1 is 3 to 500, each unit in parentheses may be randomly arranged, wherein the cured product has a water contact angle from 102-113° after an abrasion test.

2. The water repellent member of claim 1 wherein the silica layer consists of (ii) at least 50% by weight of silica nanoparticles having an average particle size of 0.1 nm to 10 nm and 0.1 to 50% by weight of nanoparticles having an average particle size of 1 nm to 10 nm, and further wherein the nanoparticles are of at least one type selected from titanium oxide nanoparticles, platinum nanoparticles, and tin oxide nanoparticles.

3. The water repellent member of claim 1 wherein the silica layer of clause (i) is formed by wet coating a dispersion of the silica nanoparticles of clause (i) in a solvent onto the substrate outer surface, and drying off the solvent.

4. The water repellent member of claim 1 wherein the silica layer of clause (ii) is formed by wet coating a dispersion of the silica nanoparticles and the nanoparticles of titanium oxide, tin oxide, silver, platinum, copper, alumina, calcium oxide, magnesium oxide, manganese oxide, nickel oxide, zirconium oxide or multi-component oxides of clause (ii) in a solvent onto the substrate outer surface, and drying off the solvent.

5. A method for preparing the water/oil repellent layer-bearing water repellent member of claim 1, the method comprising the steps of:
  wet coating a dispersion of silica nanoparticles in a solvent onto an outer surface of a substrate,
  drying the dispersion to remove the solvent and to form a silica layer,
  wet coating a solution of a fluorinated organosilicon compound in a solvent onto an outer surface of the silica layer, and
  drying the solution to remove the solvent and to cure the fluorinated organosilicon compound.

* * * * *